Patented Nov. 29, 1927.

1,650,899

UNITED STATES PATENT OFFICE.

HOWARD W. MATHESON, OF MONTREAL, QUEBEC, CANADA, ASSIGNOR TO CANADIAN ELECTRO PRODUCTS COMPANY, LIMITED, OF MONTREAL, QUEBEC, CANADA.

COMPOSITION FOR USE IN THE MANUFACTURE OF OR FOR USE AS VARNISHES AND THE LIKE AND METHOD OF MAKING THE SAME.

No Drawing.      Application filed August 19, 1922.   Serial No. 583,039.

This invention relates broadly to material for use in the manufacture of, and to compositions of matter for use as, varnishes, lacquers, shellac substitutes, paint or enamel vehicles and the like, and also to the preparation or manufacture thereof. Hereafter, the term "varnish" will be used generically to indicate all manner of surface coating materials to which the invention may be applicable.

The invention relates more particularly to varnish making materials being, and to varnish compositions containing as the essential solid ingredient, a resinous reaction product of acetylene and a phenol, either treated or admixed, or not, with a hardening agent, and hereafter termed an "acetylene-phenol" resin or resinous product; also an acetylene-phenol reaction product combined with or reacted upon by an aldehyde, an aldehydic body, or a body capable of yielding an aldehyde or aldehydic body, whether admixed or not with a hardening agent, and hereafter called an "acetylene-phenol-aldehyde" resin or reaction product.

The invention relates also to the use of such materials in the manufacture of, and to compositions for use as cements or adhesives for various purposes.

The resinous reaction products herein dealt with are largely or wholly soluble in ordinary solvents, such as alcohols and acetone, to form liquid surface coating compositions which may be applied by brushing, spraying, dipping, or in any other usual or desirable manner. These compositions, after evaporation of the solvent, and more particularly after being hardened, form surface coatings having desirable qualities of colour, elasticity, hardness, resistance to corrosion and weathering, and dielectric strength; and the majority of these coatings are capable, on suitable treatment, of being rendered partially or completely insoluble or infusible, or both. Moreover, the compositions are, generally speaking, good electric insulators and may be prepared in such a manner that the resulting surface coatings will have high dielectric strength and will be especially useful as insulating coatings in electric apparatus.

The compositions may be combined with various materials, soluble or miscible therein, such as certain oils, oleo-resins, nitro-cellulose, and other materials, and also with colouring agents, pigments and fillers. In addition, various higher boiling solvents, such as amyl alcohol, amyl acetate, toluene, and others, may be added to produce desired characteristics or qualities in the compositions or in the coatings formed therefrom.

It is impossible, within reasonable limits, to describe all, or nearly all, the chemically possible compositions or methods of manufacture and therefore the description is hereafter limited to certain compositions comprising, and methods of using, materials relatively inexpensive and readily obtainable in large quantities, such as may be used in commercial application of the invention; but it will be understood that the invention is not thereby limited in any way to such materials, proportions or methods.

In order to enable an understanding of the invention to be obtained the following illustration and examples are given, the proportions being by weight throughout:—

A catalyst composed of two and one-half (2.5) parts mercurous sulphate and one (1.0) part sulphuric acid is mixed with one hundred (100) parts phenol and dry acetylene gas is passed into the mixture, the temperature being maintained between 90° and 115° C. The gas is absorbed rapidly, the period of reaction being thirty minutes to two hours or more, depending on the rate of gas circulation and the amount of material used. Cooling may be necessary at the commencement and warming toward the end of the reaction period to maintain suitable temperature. Approximately fourteen (14) parts, by weight, of acetylene are absorbed, and the material formed, which may be termed, a primary resinous body, is a heavy liquid which, at ordinary temperatures, becomes solid or semi-solid. This material is fusible and soluble and ordinarily contains a certain amount of free or uncombined phenol, which is preferably removed or combined.

The free phenol may be removed, and to some extent combined, by heating the primary resinous body, in any suitable way, to about 140° to 150° C., and circulating acetylene gas through it and through a condenser, so arranged that the phenol which distills off is separated from the resinous body, for a suitable length of time or until all, or practically all, the free phenol, being approximately 10% to 20% of the original amount of phenol, is removed. Any other suitable gas may be used to sweep out the phenol.

The acetylene-phenol resinous product, either with or without the free phenol, is capable of combining with aldehydic bodies, as previously noted, and produces a resinous body of superior qualities. During this reaction any free phenol is combined. For instance, four hundred (400) parts of the primary resinous product is mixed with one hundred and forty (140) parts of paraldehyde, the primary resin being first warmed to, say 50° C., to render it sufficiently fluid and miscible. On the addition of the cold paraldehyde the temperature at first falls to about 35° C.; then a strong reaction sets in and cooling with vigorous stirring is necessary to prevent the temperature rising too high and causing the material to become partly insoluble. Preferably the temperature is maintained between 35° and 50° C. until the initial vigorous reaction subsides, and is thereafter maintained at approximately 50° C. for a period of one to two hours, or longer if desired. The resulting material, termed the intermediate product, is, on cooling to ordinary temperatures, a solid brittle mass which may be readily pulverized and which is soluble and fusible, having a relatively low softening point. Variations may be made in the amount of paraldehyde used and also in the reaction temperatures, higher temperatures being permissible with smaller amounts of paraldehyde.

Both of the resinous products described are capable of being rendered substantially infusible and insoluble; the first, or primary product, by admixture with a hardening agent, such as hexamethylenetetramine, and subjection to heat or heat and pressure, and the second, or intermediate product, by subjection to heat or heat and pressure, with or without the addition of a hardening agent.

The acid of the catalyst used in the first reaction may be removed or neutralized, or may be allowed to remain in the final composition. Since the acid of the catalyst will serve to catalyze the reaction with paraldehyde, it may be preferable to defer its removal or neutralization until the aldehyde reaction is effected, and thus avoid the necessity of adding another catalyst for this reaction. If hardening of the intermediate resin is to be effected without an added hardening agent, it is essential that the acid remain and for this reason it is necessary to avoid the use of solvents or other ingredients which will neutralize the acid or which contain impurities that will neutralize the acid. The mercury compound of the catalyst is preferably removed from the primary reaction product by sedimentation, filtering, centrifuging, or otherwise, using a solvent for the resinous material if necessary. If, however, the mercury compound has been allowed to remain during the aldehyde reaction, it may be readily separated from the varnish composition by sedimentation.

The resinous materials described are available for use in the manufacture of varnishes and the like, either in the forms described or after suitable treatment or admixture with other materials. The proportions of solid and solvent may vary within wide limits, depending on the solid ingredient and the purpose for which the composition is intended. The following examples will serve to indicate a few only of the possible compositions and methods of treatment.

*Example I.*—Five (5) pounds of the primary resinous product is dissolved in one (1) imperial gallon of denatured ethyl alcohol and is available as a shellac substitute for some purposes, but is not ordinarily capable of being rendered insoluble and infusible.

*Example II.*—Five (5) pounds of the primary resinous product and approximately one-half (0.5) pound hexamethylenetetramine are dissolved in one gallon of alcohol. The composition is useful as a varnish or shellac substitute. The film resulting after evaporation of the solvent is capable of being rendered substantially infusible and insoluble by the application of heat or heat and pressure. This embodiment may be regarded as a variation of the aldehyde treatment, as the hexamethylenetetramine is aldehydic in character. The hardening agent, being of a basic nature, serves to neutralize the acid of the catalyst.

*Example III.*—Five (5) pounds of the intermediate resin, in which the catalytic acid remains, is dissolved in one (1) gallon of alcohol and the film resulting after evaporation of the solvent may be rendered infusible and insoluble by heating to, say 100° C. under pressure between 80 and 200 pounds per square inch, for a period of time depending on the temperature and the pressure, and usually between five minutes and one hour, provided the catalytic acid remains active in the film after evaporation of the solvent. If the film is not hardened its sphere of usefulness may be limited.

*Example IV.*—Five (5) pounds of the intermediate resin from which catalytic acid may or may not have been removed, is mixed with 3% to 15% of its weight of hexamethylenetetramine and the two dissolved in one gallon of alcohol. The film formed after evaporation of the solvent may be rendered infusible and insoluble by the application of heat and pressure.

*Example V.*—A composition such as given in Examples III or IV is mixed with a suitable amount of dye or with a suitable amount of a suitable pigment, such as bone black, and a filler if desired, additional solvent being added if necessary. The resulting composition is useful either as a cold enamel or as a baking enamel.

It has been previously stated that the amounts of paraldehyde and of the hardening agent might be varied in the solid ingredient, and also that the temperatures prevailing in the manufacture of the ingredient might be varied. As an instance of such variations the following are given:—

One hundred (100) parts of the primary or acetylenephenol resinous product, from which the mercury has preferably been removed by suitable means, is warmed to 50° C. and fifteen (15) parts of paraldehyde is added. The temperature during the initial reaction is maintained preferably under 60° C., and may afterward be raised, up to 100° C. for a period of approximately one hour. The material on cooling is a hard, brittle mass, having a softening point of approximately 50° C., which softening point is not increased materially by any seasoning process. If the initial reaction is too vigorous, a part of the acidic body present (the acid catalyst of the primary product) may be neutralized before the reaction by any suitable method. One method which is found very convenient is by adding a small amount of aldehyde ammonia.

Alternatively, twenty (20) parts of paraldehyde are used and the initial reaction temperature maintained preferably under 60° C. for approximately fifteen to twenty minutes. The material is then heated up to 90° to 95° C. for approximately one hour. The softening point of the product is approximately 50° C. On heating still further, on a water bath, the softening point may be raised after about five hours to 55° C., and after about two days further heating, to about 70°–80° C. The material is yet completely soluble in alcohol.

The resinous products formed in either of these two ways are not capable, alone, of being hardened by heat and pressure but require the addition of a hardening agent. It will also be seen that the solid ingredient of the varnish may be prepared in such a way as to have any softening point desired, within reasonable limits.

These varnish ingredients are dealt with as in Example IV, using 3% to 15% of hexamethylenetetramine (based on the weight of resin) as a hardening agent.

While the only aldehyde mentioned in the examples is paraldehyde, it will be understood that there may be substituted, with suitable modifications of proportions and operating conditions, any suitable aldehydic material comprised within the range given at the commencement of this specification. In addition, certain bodies not aldehydic in character, for example, a phenylenediamine, may be used as hardening agents with good results. Such bodies must be considered as included with the aldehydic bodies—and other bodies such as furfuramid and ethylidene aniline—in the term "hardening agent".

The compositions are serviceable for many of the purposes for which ordinary varnishes, lacquers, shellac, enamels, and the like, are used and are in addition particularly useful on account of their good electric insulating qualities. The compositions may be used, for example, for coil impregnation, the coils being afterwards baked to render the coating infusible and insoluble. By suitably reducing the amount of solvent, a very good cement for pipe joints and the like or an adhesive for securing sheets or other articles of fibre, leather, fabric, or other materials, together, may be produced; which cements or adhesives have the great advantage that they may be rendered infusible and insoluble.

Further details and modifications of the method of making the resinous materials herein referred to may be ascertained from co-pending applications, Serial No. 539,296, filed 25th February 1922 and Serial No. 560,713, filed 13th May 1922.

In the following claims, the terms "acetylene-phenol" and "acetylene-phenol-aldehyde" are not to be regarded in any limited sense but are to be construed as generic terms including all suitable bodies embraced in the groups to which these terms are applied in the forepart of this specification. Furthermore, the term "acetylene-phenol-aldehyde" is to be considered as embraced within the meaning of the term "acetylene-phenol" and as indicating one class of such resinous matter.

Having thus described my invention, what I claim is:—

1. A composition of matter capable of use as a varnish, cement or the like comprising, an acetylene-phenol resinous body, a hardening agent, and a solvent.

2. A composition of matter capable of use as a varnish, cement or the like comprising, an acetylene-phenol-aldehyde resinous body, and a solvent therefor.

3. A composition of matter capable of use as a varnish, cement or the like comprising, an acetylene-phenol-aldehyde resinous body, a hardening agent, and a solvent.

4. A composition of matter capable of use as a varnish, cement or the like comprising, a fusible and soluble acetylene-phenol resinous body capable of being rendered infusible and insoluble, a hardening agent, and a solvent.

5. A composition of matter capable of use as a varnish, cement or the like comprising, a fusible and soluble acetylene-phenol-aldehyde resinous body capable of being rendered infusible and insoluble, and a solvent therefor.

6. A composition of matter capable of use as a varnish, cement or the like comprising, a fusible and soluble acetylene-phenol-aldehyde resinous body capable of being rendered infusible and insoluble, a hardening agent, and a solvent.

7. A composition of matter capable of use as a varnish, cement or the like comprising, a fusible and soluble acetylene-phenol resinous body, an aldehydic body capable of combining therewith under conditions of heat and pressure to form an infusible and insoluble body, and a solvent for said resinous body and aldehydic body.

8. A composition of matter capable of use as a varnish, cement or the like containing, an acetylene-phenol resinous body, hexamethylenetetramine, and a solvent.

9. A composition of matter capable of use as a varnish, cement or the like containing, an acetylene-phenol-aldehyde resinous body, hexamethylenetetramine, and a solvent.

10. A composition of matter capable of use as a varnish, cement or the like containing, a reaction product of acetylene and phenol reacted upon by paraldehyde, and a solvent.

11. A composition of matter capable of use in the manufacture of varnish, cement, or the like comprising, a fusible and soluble acetylene-phenol-aldehyde reaction product.

12. A composition of matter capable of use in the manufacture of varnish, cement, or the like comprising, a fusible and soluble acetylene-phenol resinous body, and a body capable, with application of heat and pressure, of combining therewith and forming an infusible and insoluble body.

13. A composition of matter capable of use in the manufacture of varnish, cement, or the like comprising, a fusible and soluble reaction product of acetylene with a phenol, admixed with an aldehydic body capable of combining with said reaction product, on application of heat and pressure and forming an insoluble and infusible body.

14. A process of making varnish, cement, or the like, which includes, reacting on a phenol with acetylene, reacting on the product with an aldehydic body, and dissolving the resulting product in a volatile solvent.

15. A process of making varnish, cement, or the like, which includes, reacting on a phenol with acetylene, mixing a hardening agent with the resulting product, and dissolving the whole in a volatile solvent.

16. A process of making varnish, cement, or the like, which includes, reacting on a phenol with acetylene, in presence of a catalyst, reacting on the resulting product with an aldehydic body, removing the catalyst, and dissolving the product in a volatile solvent.

17. A process of making varnish, cement, or the like, which includes, reacting on a phenol with acetylene, reacting on the product with an aldehydic body, mixing a hardening agent with the resulting product, and dissolving the whole in a volatile solvent.

In witness whereof I have hereunto set my hand.

HOWARD W. MATHESON.